April 30, 1968 S. W. SPELBRINK 3,380,498
PANEL ROUTER

Filed Nov. 5, 1965 5 Sheets-Sheet 4

SHERBURNE W. SPELBRINK
INVENTOR
BY
BUCKHORN, BLORE, KLARQUIST & SPARKMAN
ATTORNEYS

April 30, 1968  S. W. SPELBRINK  3,380,498
PANEL ROUTER

Filed Nov. 5, 1965  5 Sheets-Sheet 5

SHERBURNE W. SPELBRINK
INVENTOR

BY
BUCKHORN, BLORE, KLARQUIST & SPARKMAN
ATTORNEYS

United States Patent Office 3,380,498
Patented Apr. 30, 1968

3,380,498
PANEL ROUTER
Sherburne W. Spelbrink, 428 Simpson,
North Bend, Oreg. 97459
Filed Nov. 5, 1965, Ser. No. 506,475
5 Claims. (Cl. 144—69)

ABSTRACT OF THE DISCLOSURE

A panel router having a carriage movable horizontally along guide rails between a fixed stop and one of several other stops, the intermediate ones of which are movable out of the path of the carriage so that it has a variable length of travel. A turret on the carriage mounts a pair of router units having cutters of different widths and swings one or the other of such units into cutting position. Thus the length of carriage travel determines the length of the resulting recess, whereas the width of recess is determined by the router unit selected. The length and width of cut are preselected by actuating appropriate selector switches on a control panel. Power to swing the turret, move the carriage and position the stops is provided by air cylinders which are controlled by solenoid valves.

---

The present invention relates to a machine for routing out recesses in panels and more especially to a panel router capable of forming recesses of different sizes for removing surface defects in panels and for receiving patches of corresponding sizes.

In the manufacture of plywood, several hand-operated routers having cutting elements of different sizes have been used heretofore to form recesses of various standard lengths and widths, depending on the size of the defect to be removed, for receiving precut patches of corresponding sizes. Skill and good judgment were thus required of the operator in forming a recess by hand so that the patch would fit the recess in every instance. Much time was also consumed in changing from one router to another and in making the actual cut.

Accordingly, the primary object of the present invention is to provide a single panel routing machine to replace the several prior hand-operated machines in plywood patching operations and thereby eliminate the disadvantages inherent in using hand-operated machines.

More specifically, a primary object of the invention is to provide a single machine capable of routing out recesses of several different sizes, including several different lengths and widths.

Another important object is to provide a machine which automatically, upon preselection, forms a recess of one of several different predetermined sizes.

Another object is to provide a machine as aforesaid which speeds up the recess-forming operation and the overall time required to patch a panel as compared with prior machines.

Still another object is to provide a machine as aforesaid which consistently forms each size of recess with a high degree of accuracy.

A further object is to provide a machine as aforesaid which eliminates much of the skill and guesswork required in forming recesses with prior machines.

Other objects include providing a machine as aforesaid which is simple and inexpensive to construct, operate and maintain.

The above and other objects and advantages will become more apparent from the following detailed description which proceeds with reference to the accompanying drawings wherein:

FIG. 4A is an insert view showing the upper portion of the carriage end member with its limit switch removed to illustrate an adjustable turret stop;

FIG. 7 is a top plan view of a panel of plywood illustrating schematically the various sizes of recesses that can be cut with the illustrated machine;

FIG. 8 is a front view of the control panel of the machine taken along the line 8—8 of FIG. 1; and FIG. 9 is a schematic view showing the air circuit and limit switches for operating the various machine elements.

General Assembly

Figure 1:
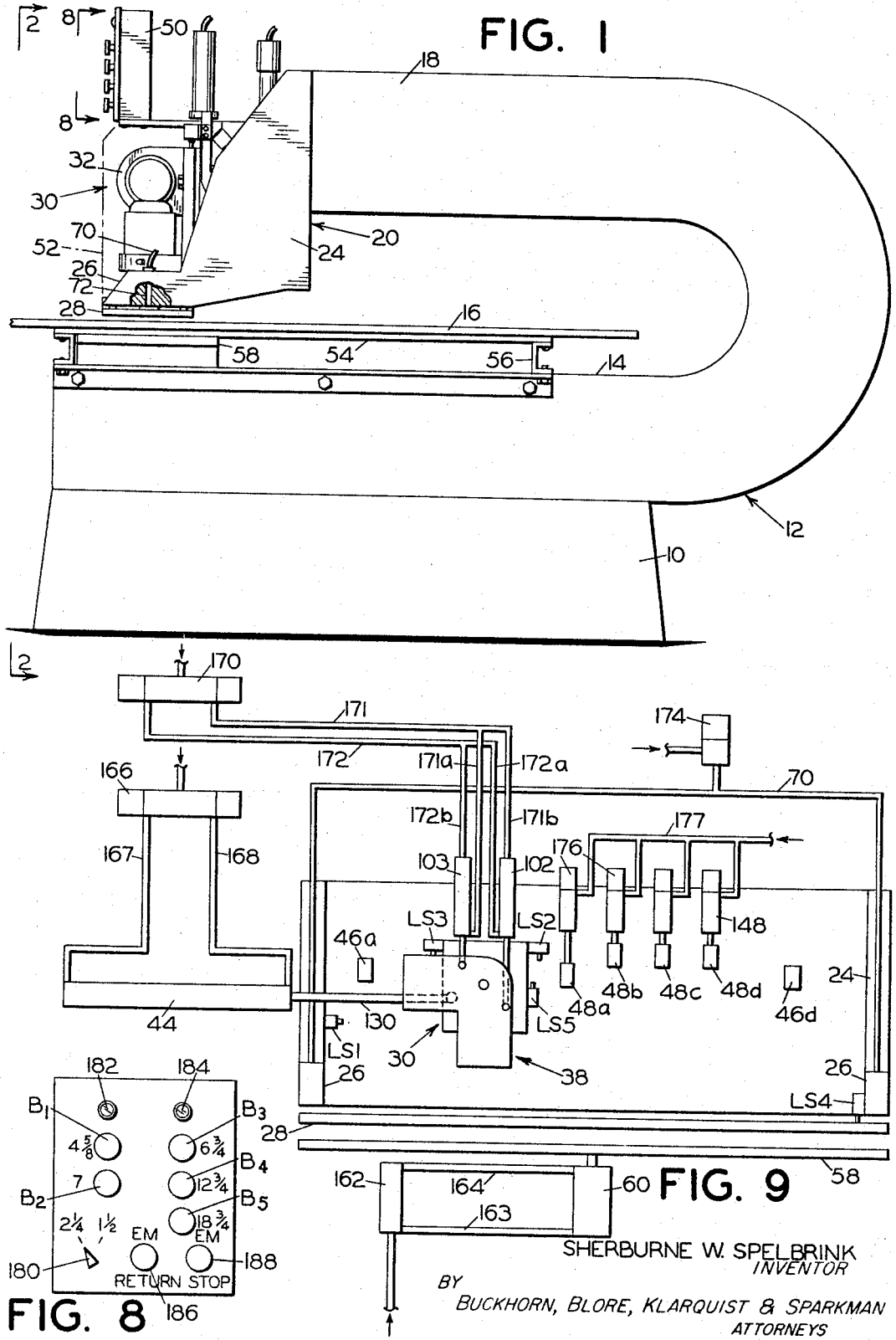
FIG. 1 is a side elevational view of a panel router in accordance with the invention, with the outer cover of the carriage housing being removed for clarity.
Figure 2:
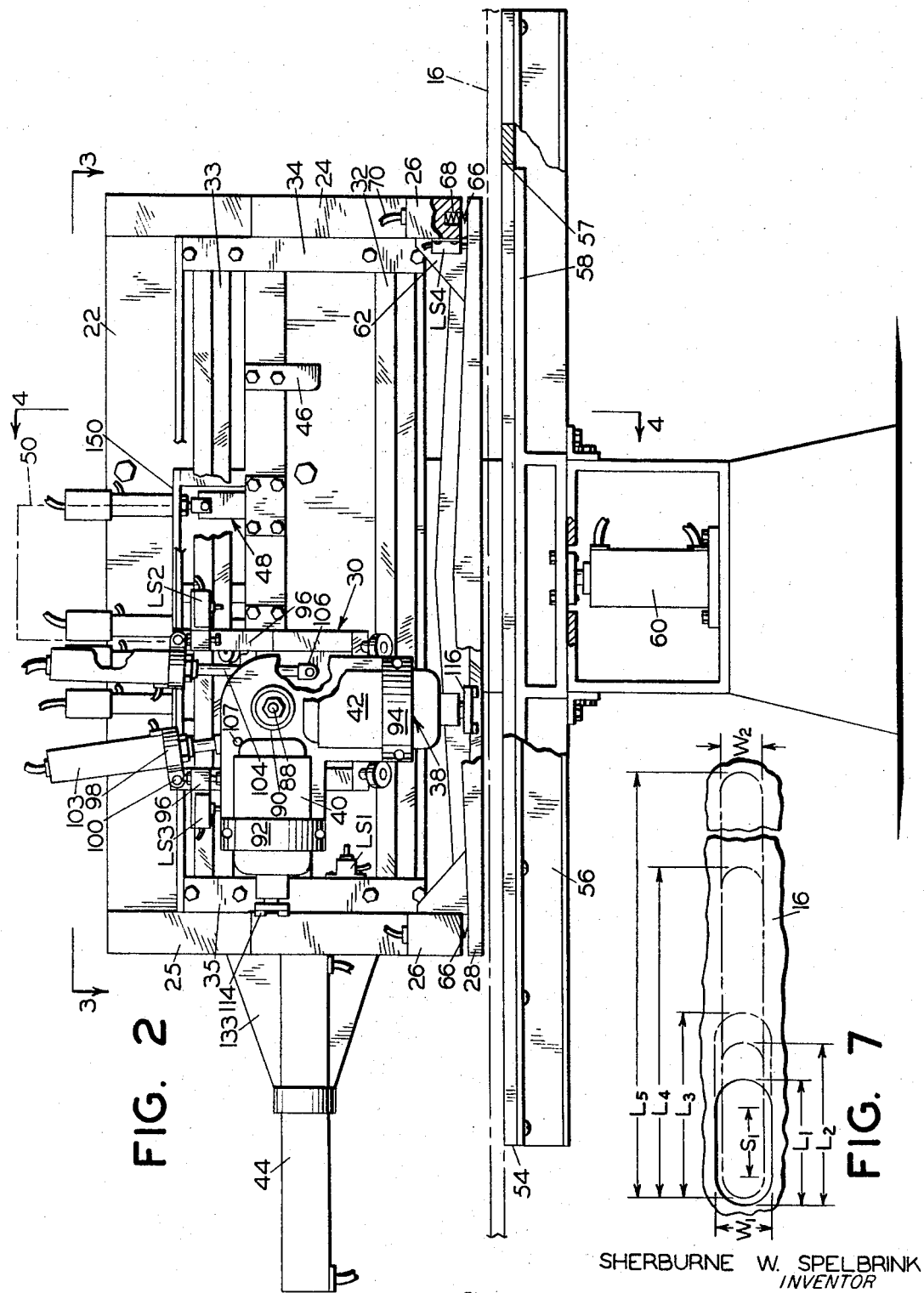
FIG. 2 is a front elevational view of the machine of FIG. 1 on a somewhat enlarged scale, with portions broken away for clarity.

With reference to the drawings, FIGS. 1 and 2 illustrate a panel router having a base 10 supporting a generally U-shaped machine frame 12 including a lower frame portion 14 for supporting a panel 16 to be repaired and an upper frame portion 18 formed as a continuation of, and cantilevered over, the lower frame portion. The upper frame supports at its outer end a carriage housing 20 spaced above the panel. The carriage housing consists of a vertical main backing plate 22 and a pair of end support members 24, 25 which extend forwardly from the opposite ends of the main plate. The end supports include forward extensions 26 which support a panel hold-down plate 28 for vertical movement above the lower frame portion and panel supported thereon.

A carriage assembly indicated generally at 30 is mounted for horizontal movement between the opposite ends of the carriage housing on vertically spaced-apart rails 32, 33 anchored at their opposite ends in clamping members 34, 35. The carriage assembly includes a turret 38 mounting a pair of router motors 40, 42, the turret being mounted for pivoting movement about a horizontal axis so that one or the other router can be swung vertically into cutting position as shown by the router unit 42. A horizontal air cylinder 44 moves the carriage along the rails to give the recess oblong shape and necessary length. The length of cut is determined by variable carriage limiting means including a stop assembly comprising a pair of fixed end stops 46, only one of which is visible in FIG. 2, and a series of movable intermediate stops 48 positioned along the path of the carriage between the two end stops.

Selection of one of several lengths and widths of cut desired is made by actuating a width selector switch and one of five length selector buttons on a control panel 50 at the front of the carriage housing.

As shown in phantom lines in FIG. 1, the interior of the carriage housing would normally be enclosed by side, top and front walls 52 so that only the control panel is accessible to the operator. The front wall is provided with an opening for viewing the hold-down plate and positioning a panel therebeneath.

Panel-supporting and holding means

Still referring to FIGS. 1 and 2, the panel 16 to be patched is placed between the upper and lower frame portions of the machine and rested on a table 54 of plywood or other suitable material having a gloss-finished top surface and secured to a pair of upstanding channel members 56 bolted to the lower frame portion. A lower panel-clamping plate 58 is movable upwardly against the underside of panel 16 from its lowered position within an opening 57 in the table to lift the panel into engagement with the hold-down plate 28 by an air cylinder 60 mounted within the hollow front end of lower frame portion 14, as clearly shown in FIG. 2.

Beveled plate mounting blocks 62 at the opposite ends of the hold-down plate include rear key extensions which slide within vertical keyways 64 in the front extensions 26 of the end supports 24, 25 (see FIG. 3) to mount the plate for limited vertical movement from a lower position as shown in FIG. 2 to an upper position wherein the top surface of the hold-down plate abuts the bottom surface of the end supports 24 and 25. Coil springs 66 within bottom openings 68 in the end members (FIG. 2) bias the hold-down plate in its lowermost position and provide for pressured travel of the plate to its upper position when lower plate 58 lifts a panel thereagainst. This prevents shifting of the panel after it has been clamped between the plate and the table. Air from a blower (not shown) is directed through hose lines 70 and down through vertical openings 72 (FIG. 1) in the forward extensions of end supports 24, 25 to blow wood chips and other foreign matter from between the hold-down plate and the end extensions so that the plate and thus the panel 16 will always be level when the plate abuts such extensions. This feature assures formation of a recess of constant depth.

Figure 3:
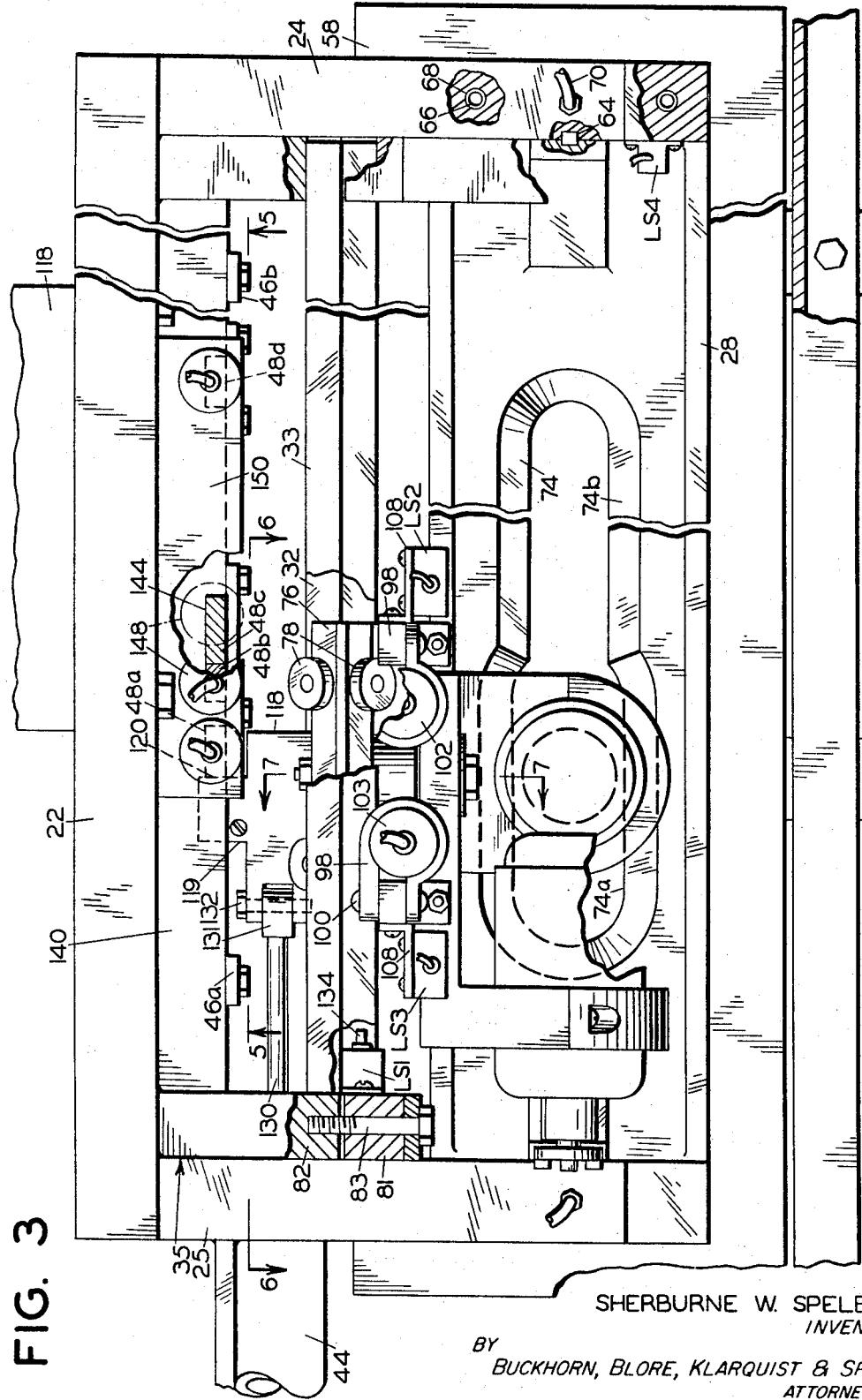
FIG. 3 is a top plan view of the interior of the carriage housing taken along the line 3—3 of FIG. 2 on a scale somewhat enlarged over that of FIG. 2.

As shown in FIG. 3, the hold-down plate has an elongate machined opening 74 extending along its centerline, the overall length of which is approximately the length of the longest possible cut plus the necessary clearance for cutter operation. The router cutters when in their cutting positions work within the area defined by the opening, and therefore the centers of the routers when swung to their vertical positions are centered in vertical alignment with the opening. The opening also serves as a sight gauge whereby when a panel defect to be removed is positioned beneath the opening, the size of recess that will be required to remove such defect can be readily estimated. For this purpose the opening includes two portions of different widths, including a wide portion 74a having a length approximating the longest wide cut and within which the wide router cutter works. A second, narrower portion 74b of the opening defines an area within which the narrow router cutter works during the last portion of its stroke. Markings (not shown) may be provided alongside the opening at positions corresponding to the various lengths of cut possible with the router so that the operator can quickly estimate which length and width of cut will be required to remove a given defect.

Carriage assembly

Figure 4:
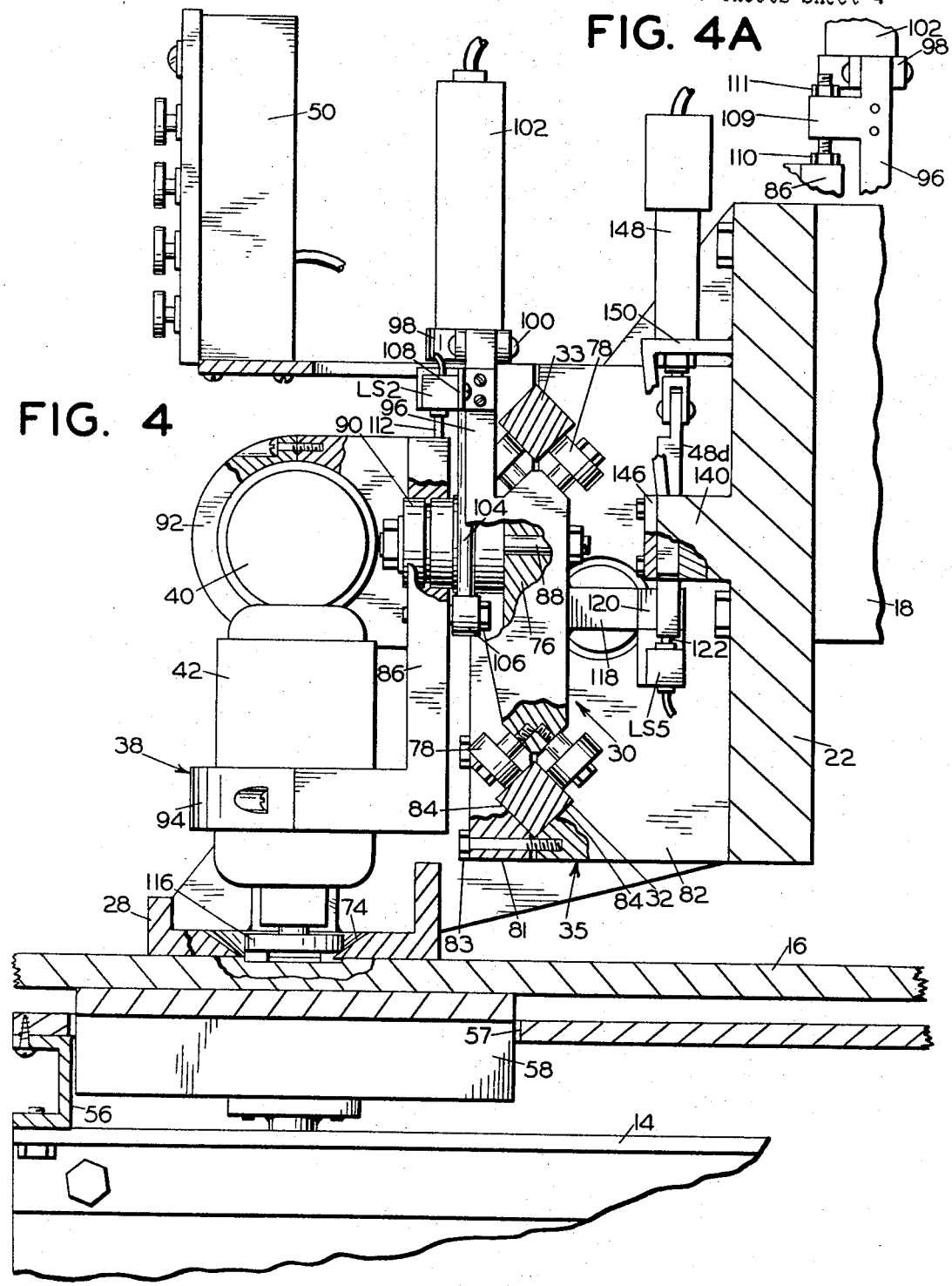
FIG. 4 is a vertical sectional view through the carriage housing taken along the line 4—4 of FIG. 2 on a scale somewhat enlarged over that of FIG. 2.

Referring now especially to FIGS. 3 and 4, the carriage assembly 30 includes an upstanding carriage member 76 movably mounted on rails 32, 33 by a series of eight rollers 78 mounted in pairs, with each pair being mounted at ninety degrees to one another for engaging adjacent surfaces of the rails, which are square in cross section. Each rail 32, 33 is rigidly mounted with one pair of opposite corners in vertical alignment in clamping members 34 and 35. Each clamping member is composed of two mating sections 81 and 82 which are drawn together by screws 83 to clamp the opposite ends of the rails therebetween within mating recesses 84 in such sections. Clamping the rails in this manner enables the rails to resist more effectively any tendency to sag due to the weight of the carriage.

The disposition of the rails also has the advantage of placing their greatest thicknesses vertically to resist sagging and also to resist any tendency for lateral movement of the carriage relative to the rails. The foregoing rail construction permits either rail to be rotated whenever one pair of rail surfaces begins to show signs of wear from the carriage rollers.

The turret 38 includes an angular main plate 86 mounted by a bearing structure 90 on carriage member 76 for pivotal movement about the axis of a horizontal shaft 88. A pair of router holding brackets 92, 94 extend forwardly from opposite ends of turret plate 86 and retain the two router motors 40 and 42, respectively.

A pair of end extension members 96 at opposite sides of carriage member 76 extend above carriage member 76. A pair of yoke-like cylinder mounts 98 are pivoted at 100, one to the upper end of each end extension 96, and carry a pair of air cylinders 102 and 103 for pivoting the turret about the axis of shaft 88. For this purpose, the piston rods 104 of the turret cylinders are pivoted at their lower ends at 106, 107 (see FIG. 2) to the back side of turret plate 86 on opposite sides of shaft 88.

Each carriage extension member 96 carries near its upper end an angle bracket 108 to which a limit switch LS2, LS3 is fastened. Each limit switch has a contact 112 in a downward position for engaging an upper edge of turret plate 86 (see FIG. 4) when one of the routers is swung to its vertical, cutting position. These switches are a safety feature as well as an inmportant part of the control circuit. Power cannot be supplied to the routers, carriage cylinder solenoid or table cylinder solenoid to operate the same unless one router or the other is in its vertical, cutting position wherein one or the other switch is closed. This result is achieved because switches LS2 and LS3 energize the narrow and wide selector buttons, respectively, on the control panel.

As shown in FIG. 4A, each carriage end member 96 has a forward projection 109 near its upper end, hidden in FIG. 4 by limit switch LS2. An adjustable stop 110 is threaded through each projection to engage the same edge of turret back plate 86 as its associated limit switch and thereby limit upward pivoting movement of the plate so that each router when swung to its cutting position will be stopped at the vertical. A lock nut 111 is provided to maintain the adjustment of each stop.

The routers 40 and 42 have, respectively, cutting elements 114 and 116 (see FIG. 2), the cutting element 116 being wider than the cutting element 114 so that a recess of either of two different widths can be cut, depending on which router is employed.

The main carriage member 76 also includes a rearward extension 118, the most rearward portion 119 of which has a vertical face 120 which serves as a stop-engaging surface for limiting carriage travel in a manner described in greater detail hereinafter. The carriage extension 119 also carries therebeneath a limit switch LS5 having a contact 122 which engages the same stop as the carriage extension face 120 to effect return of the carriage to its starting position after completion of its cutting stroke with the router motor operating.

Figure 6:
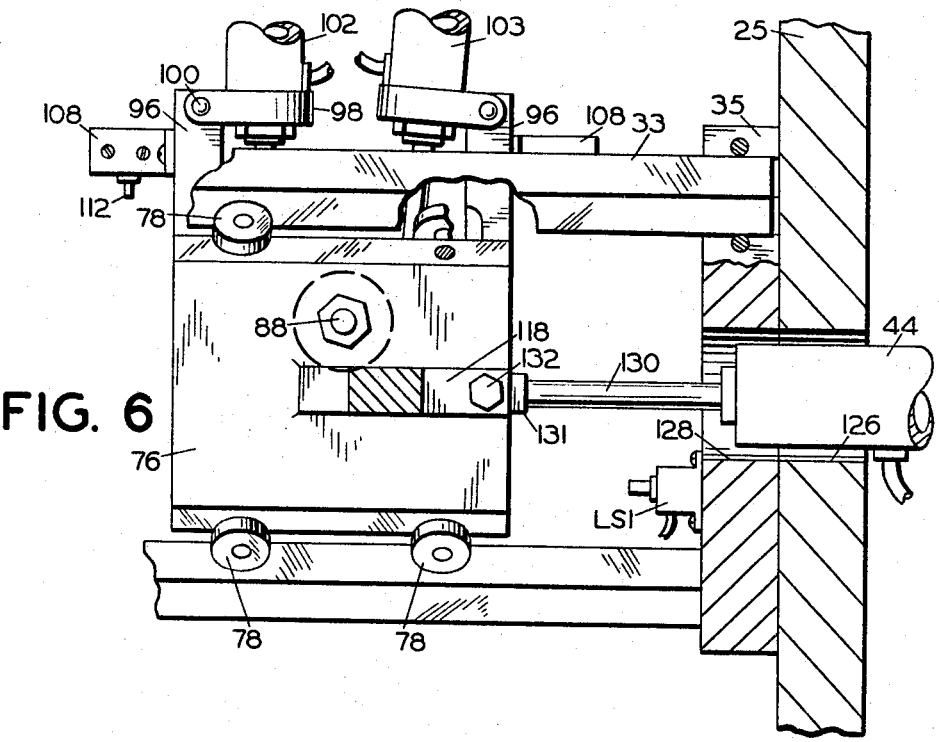
FIG. 6 is an elevational view partly in section taken along the line 6—6 of FIG. 3 showing the back side of the carriage assembly and the means for moving the same.

As shown best in FIGS. 3 and 6, the carriage cylinder 44 extends partially through openings 126 and 128 in the housing end member 25 and rail clamp 35, respectively, and has a piston rod 130 with a cross head 131 at its forward end pivoted at 132 to the rear extension 118 of the carriage. The carriage cylinder itself is mounted by cylinder mount 133 (FIG. 2) to the main housing plate 22. Another limit switch LS1 is fastened to the inside surface of rail clamping member 35 in a position such that its contact 134 is engaged by the adjacent side edge of carriage member 76 when the latter is retracted to its starting position. The switch when closed serves to shut off power to the various machine elements and to condition the various electrical circuits for starting another cutting cycle.

Stop assembly

Figure 5:
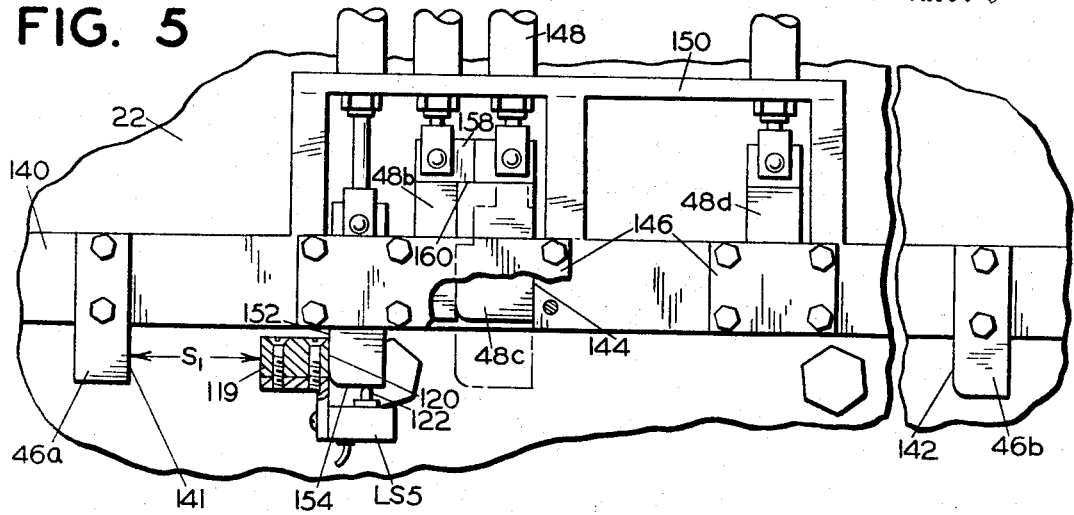
FIG. 5 is an elevational view, partly in section, of the rear portion of the carriage housing including the stop assembly and part of the carriage, taken approximately along the line 5—5 of FIG. 3.

With reference now to FIG. 5, the stop assembly for controlling carriage travel and therefore the various lengths of cut possible, is composed of a stop bar 140 mounted on main carriage housing plate 22 and extending parallel to and beside the path of travel of the carriage, such bar mounting the previously mentioned fixed end stops 46 and movable stops 48. More specifically, a fixed stop 46a is affixed to the stop bar near the left-hand, or starting, end of the latter, and such stop extends downwardly into the path of the rear carriage extension 119 so that the right-hand edge 141 of such stop defines the starting limit position of the carriage. The other fixed end stop 46b is attached to the stop bar near its right-hand end and extends into the path of the carriage extension 119 so that the left-hand edge 142 of such stop defines the end limit position of the carriage when making its longest possible cut. Between the two fixed stops, four movable stops 48a, 48b, 48c and 48d are slidably mounted within recesses 144 in stop bar 140 for downward reciprocating movement into the path of carriage extension 119 to limit carriage travel at four different positions short of fixed stop 46b. Keeper plates 146 retain the movable stops in their recesses. A series of four solenoid-actuated air cylinders 148 mounted on a platform 150 above the stop bar reciprocate the movable stops independently of each other.

Three of the movable stops are shown in their normally upwardly retracted positions, but the fourth, stop 48a, is shown in its downmost position wherein its left-hand edge 152 abuts face 120 of carriage extension 119 to limit the length of the router cutting stroke to the distance $S_1$, which is the distance a router cutter will travel in a panel as the carriage moves from fixed stop 46a to movable stop 48a. The distance $S_1$ is also indicated in FIG. 7 showing schematically the possible lengths and widths of recesses that can be formed with the present machine. A cutting stroke of length $S_1$ will form a recess of total length $L_1$ equal to the length of the cutting stroke plus the width of the router cutting element. At the same time that side edge 152 of movable stop 48a engages carriage extension 119, the bottom edge 154 of the same stop depresses contact 122 of limit switch LS5 to close the same and thereby return the carriage to its starting position. The interaction of carriage extension 119, limit switch LS5 and each of the other movable stops and end stop 46b is exactly the same as just described with respect to stop 48a.

From FIGS. 5 and 7 it will be apparent that the machine is capable of cutting recesses of five different lengths since there are a total of five carriage travel-limiting stops. These lengths are indicated as $L_1$ through $L_5$ in FIG. 7. It will be noted that the two recesses of lengths $L_1$ and $L_3$ are formed with router 42 having wide cutting element 116, and so have a width $W_1$ whereas the three recesses of lengths $L_2$, $L_4$ and $L_5$ are formed by router 40 having narrow cutting element 114 and therefore have a narrower width $W_2$.

The two recesses of lengths $L_2$ and $L_3$ are actually so close in length, although of different widths, that the stops 48b and 48c which determine such lengths are in side-by-side abutting relationship with an upper side projection 158 of stop 48b engaging a shoulder 160 of stop 48c. Thus, when stop 48b is moved downward by its air cylinder, such stop moves stop 48c down with it, whereby the two stops act as one to provide rigidity to the stop 48b that would otherwise be lacking. However, when stop 48c is moved downward by its air cylinder, stop 48b does not move down with it, this being unnecessary because stop 48c is, of itself, broad enough to stop carriage movement abruptly without deflection.

Power and control circuits

As previously mentioned, all of the various machine elements are actuated by air cylinders, with the admission of air under pressure into the cylinders from a remote source (not shown) in turn being controlled by solenoid valves, as indicated in the diagrammatic view of FIG. 9.

Table cylinder 60 is operated through a solenoid valve 162 which admits air under pressure from the remote source into one or the other of supply and return lines 163 and 164 to either raise or lower table 58. Similarly, a carriage solenoid valve 166 controls the admission of air under pressure from the same source into one or the other end of double-acting carriage cylinder 44 through supply and return lines 167 and 168.

Another, turret solenoid valve 170 controls the supply of air to turret cylinders 102 and 103 through lines 171 and 172. It will be observed that line 171 branches into lines 171a and 171b, with line 171a admitting air into the bottom of cylinder 103 and line 171b at the same time admitting air into the top of cylinder 102 so that both cylinders coact to swing the turret, with cylinder 103 pulling and cylinder 102 pushing turret 38 to its illustrated position wherein router 42 having large cutter 116 is in cutting position. Similarly, line 172 divides into branch lines 172b and 172a so that air is supplied to the bottom of cylinder 102 and the top of cylinder 103 at the same time whereby router 40 is also pivoted to its operating position through coaction of both cylinders.

A blower solenoid valve 174 when opened admits air under pressure into line 70 which then directs the air into openings 72 in the end extensions 26 of the carriage housing and into the gap between extensions and the hold-down plate 28.

Each of the four air cylinders 148 for actuating movable stops 48a through 48d has a solenoid valve 176 mounted thereon for controlling the entry of air into the upper end of each of such cylinders. Air from the remote source enters the stop cylinders through a main line 177 and parallel branch lines leading therefrom to each of the four cylinders.

A suitable electrical control circuit, including selector switches on the control panel and limit switches LS1 through LS5, is provided for automatically cycling the machine through one preselected cutting operation by energizing the various air cylinder solenoids at the proper time. As shown in FIG. 8, the control panel 50 includes two vertical rows of switch buttons for selecting the length of cut desired, including a left-hand row of two buttons $B_1$ and $B_2$ which control the length of wide cut and a right-hand row of three buttons $B_3$, $B_4$ and $B_5$ which control the length of narrow cut to be made. The length of cut made by pressing each button is indicated next to that button, and in the illustrated machine the stops are positioned for making wide cuts of 4⅝ and 7 inch lengths and narrow cuts of 6¾, 12¾ and 18¾ inch lengths, as indicated adjacent the buttons.

A width selector switch 180 is provided in the lower left-hand corner of the panel, which, when turned to the left, energizes the turret solenoid 170 in a direction that causes air to enter the turret cylinders 102 and 103 so as to swing the wider outer cutter 116 into cutting position. When turned to the right, selector switch 180 closes a circuit which causes the turret to swing the narrow router cutter 114 into cutting position. Whenever selector switch 180 is turned either to the right or to the left, one of two indicator lights 182, 184 at the top of each column of buttons B is illuminated, depending on the direction the width selector switch is turned, to indicate the column from which the length of cut must be selected. For example, when selector switch 180 is turned to the left so that the wide router will be used, light 182 is illuminated to indicate that the length selection must be made by pressing either button $B_1$ or button $B_2$. The width of cut which will be made by turning switch 180 in either direction is indicated above such switch, these widths being indicated as 2¼ and 1½ inches in the illustrated machine.

When one of the length selector buttons is depressed to close a starter switch in one of the control circuits, several things happen at approximately the same time. The stop solenoid 176 for the air cylinder 148 which actuates the selected stop 48 is energized to move the stop to its lowered position, unless of course the longest cut is selected, in which case none of the movable stops are lowered. At about the same time, the selected router motor starts, the table solenoid is energized to lift the table and bring the panel up against the hold-down plate, and the blower solenoid is energized whereby chips are blown from the hold-down plate. While the foregoing occurs, a time delay holds the carriage at its starting position. However, when the hold-down plate rises to close limit switch LS4, the carriage solenoid becomes energized and the carriage starts its cutting stroke.

Two other, emergency switch buttons 186 and 188 are provided at the bottom of the control panel, the button 186 being an emergency return button to return the carriage to its starting position during the course of a cutting cycle, and the button 188 being an emergency stop button for stopping the carriage, if necessary, during the course of a cutting cycle. Once a cutting is begun by the carriage leaving its starting position, the selected circuit is sealed in by the opening of limit switch LS1 so that thereafter any tampering with or accidental pushing of the switch buttons, other than the emergency buttons, will not alter the preselected cutting cycle.

Operation

To operate the foregoing-described machine, the operator places the panel 16 across the two channels 56 and beneath the hold-down plate and shifts the panel until he sights the defect to be removed in the opening 74 of such plate. Markings on the plate for the various lengths of cuts are preferably provided next to the opening so that the operator can quickly and easily determine the length and width of cut necessary to remove the defect. When this has been determined, the operator turns the selector switch 180 on the control panel to the width of cut desired, causing the turret to shift the selected router into cutting position. When this occurs, the turret will close either limit switch LS2 or limit switch LS3 to energize only the column of length selector buttons for the lengths capable of being cut by the selected router width.

Thereafter the operator depresses one of the length selector buttons B in the column beneath the illuminated one of lights 182 and 184, resulting in the selected one of movable stops 48 being lowered into the path of the carriage to determine its travel, the table rising to clamp the panel 16 against the hold-down plate, and air being blown onto the ends of the hold-down plate to remove any foreign matter therefrom. When the hold-down plate rises and bottoms against the undersurface of end supports 24 and 25, limit switch LS4 closes to energize the carriage solenoid, so as to extend carriage cylinder 44 and thereby move the carriage away from fixed stop 46a.

The carriage continues to move the router through its cutting stroke until carriage extension 119 engages the lowered one of movable stops 48 or fixed stop 46b, depending on whichever length was selected, whereupon the carriage and router travel is stopped and limit switch LS5 is closed to return the carriage to its starting position.

When the carriage reaches its starting position it re-engages limit switch LS1 to de-energize the table solenoid, and thereby lower the table, de-energize and thus close the carriage and blower solenoid valves, shut off the router motor, and at the same time reclose a circuit to the selector switch 180 so that the machine can be restarted by pressing one of the length selector buttons B. This completes one operating cycle of the machine.

The illustrated machine is shown making a recess 2¼ inches wide and 4⅝ inches long, as indicated in solid lines in FIG. 7. This requires that the operator first turn width selector switch 180 to the left as shown in FIG. 8 to cause the turret to swing router motor 42 into operating position, and the light 182 on the control panel to illuminate. Then the operator would depress button $B_1$, causing stop 48a to drop into the path of the carriage and the foregoing sequence of operations to be performed.

Any suitable electrical circuit can be used in conjunction with the described limit switches, selector switches and solenoids so long as it enables such elements to carry out the foregoing-described functions in the stated sequence. Such an electrical circuit forms no part of the present invention and is therefore not shown, as suitable circuit could be devised by any skilled electrician.

From the foregoing description it will be apparent that the illustrated machine is capable of handling panels of different thicknesses because of the self-adjusting characteristics of the support table and hold-down plate when the latter bottoms against the underside of the housing end supports.

It will also be apparent that the machine could be modified, by varying the number of movable stops, the positions of the stops, the number of routers, and the widths of the cutters, to make lengths and widths of cuts different than those illustrated and to make a greater or lesser number of cuts of different sizes, depending upon the demands of the operation for which the machine is intended.

Having illustrated and described my invention in what is considered to be at the present time the preferred embodiment thereof, it should be apparent to those skilled in the art that my invention permits of modification in arrangement and detail. Accordingly, I intend to limit my invention, not by the foregoing description, but only by the provisions of the following claims.

I claim:

1. A panel router for cutting recesses of different preselected sizes comprising:
    means defining a rigid frame, including a guide rail,
    carriage means movable on said guide rail,
    turret means on said carriage,
    at least two router means carried by said turret, each having a cutting element of different cutting width than the other for forming recesses of at least two different widths,
    pneumatic means for rotating said turret to place each of said cutting elements alternatively in cutting position,
    and stop means for limiting the length of travel of said carriage and thus the length of a recess including an end stop defining the end of the path of travel of said carriage and at least two movable stops movable transversely into said path between said end stop and the starting position of said carriage and pneumatic means operable upon preselection to move one of said movable stops into said path whereby recesses of at least two different lengths can be formed.

2. A panel router for cutting recesses of different preselected sizes comprising:
    means defining a rigid frame,
    carriage means movable on said frame,
    router means including at least two router cutting elements each of a different cutting width,
    turret means mounting said router cutting elements on said carriage means,
    fluid powered extensible means for pivoting said turret means and thereby positioning one or the other of said cutting elements in cutting position,
    limit means on said frame for varying the length of travel of said carriage and thus the length of said cutting stroke,
    said limit means including opposite end stops and a plurality of movable stops movable transversely into the path of said carriage at different positions along said path between said end stops, and movable stop actuating means including a separate fluid powered extensible means for actuating each of said movable stops independently of one another.

3. A panel router for cutting recesses of different preselected sizes comprising:

means defining a rigid frame, including a guide rail, carriage means movable on said guide rail, turret means on said carriage and rotatable about a generally horizontal axis, extending laterally of the path of travel of said carriage, at least two router means carried by said turret, each having a cutting element of different cutting width than the other for forming recesses of at least two different widths, stop means for limiting the length of travel of said carriage and thus the length of a recess, including an end stop defining the end of the path of travel of said carriage and at least one movable stop movable into said path between said end stop and the starting position of said carriage, and power means on said carriage for rotating said turret, said power means comprising a pair of fluid powered cylinder means connected to said turret on opposite sides of said axis and supplied with fluid so that when one said cylinder means is pushing said turret means, the other said cylinder means is pulling said turret means about said axis.

4. A panel router comprising:

means defining a rigid frame, carriage means movable on said frame, router means on said carriage relatively movable into a panel so that movement of said carriage provides the cutting stroke for said router means, said router means including at least two router cutting elements, each of a different cutting width, one or another of said cutting elements being movable alternatively into a panel upon preselection thereof, a panel hold-down plate having an elongate opening therethrough for receiving said cutting elements in their operative positions, the overall length of said opening approximating the maximum cutting stroke, said opening including a wide portion of a width approximating the widest possible cut and a narrow portion of a width approximating the narrowest possible cut, said wide portion having a length approximating the longest possible wide cut, whereby said opening provides a sight gauge for aligning a defect in a panel therebeneath and for estimating the length and width of cut required to remove said defect.

5. A panel router comprising:

means defining a rigid frame, carriage means movable horizontally on said frame, turret means on said carriage means pivotable about a horizontal axis, at least two routers carried by said turret means, first fluid motor means for pivoting said turret means to place one or another of said router means in cutting position, a plurality of movable stops movable transversely into the path of said carriage means for limiting variably the length of travel of said carriage, second fluid motor means for moving each of said movable stops independently of the other said stops into said path, third fluid motor means for moving said carriage means along said path, preselector switch means for preselecting a desired length and width of cut, solenoid-actuated fluid valve means and electrical means interconnecting said preselector switch means and said solenoid-actuated valve means for actuating said first, second and third fluid motor means, and sequencing means for activating said first, second and third fluid motor means in predetermined sequence to complete a routing cycle upon actuation of said preselector switch means, said sequencing means including limit switch means on said carriage engageable by said stops and by said turret means.

References Cited

UNITED STATES PATENTS

| | | | |
|---|---|---|---|
| 1,777,286 | 10/1930 | Aldeen | 144—69 |
| 2,644,495 | 7/1953 | Bennett et al. | 144—136 |

FOREIGN PATENTS 516,584 1/1931 Germany.

DONALD R. SCHRAN, *Primary Examiner.*